Figure 1:
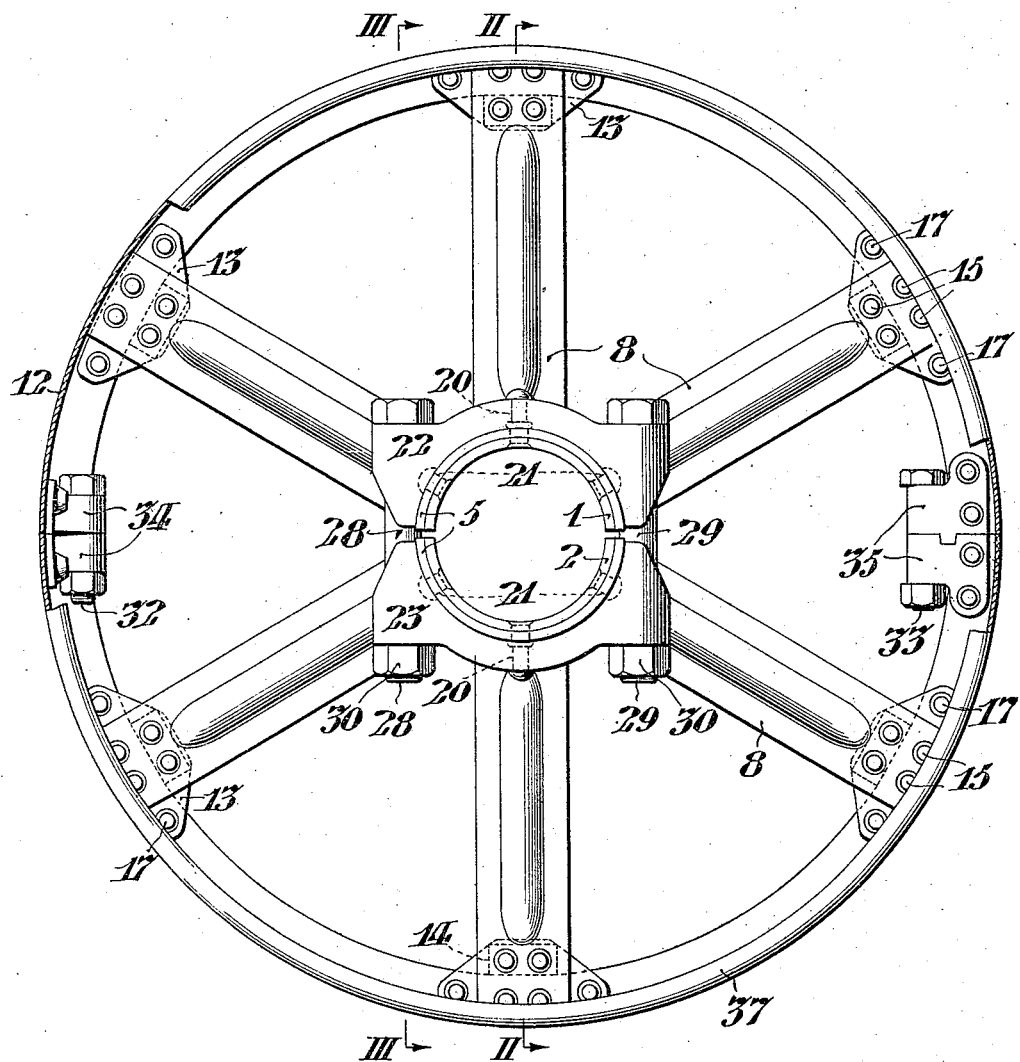

No. 849,309. PATENTED APR. 2, 1907.
J. E. ZIMMERMAN.
WHEEL.
APPLICATION FILED MAY 26, 1905.

3 SHEETS—SHEET 1.

WITNESSES:
Clifton C. Hallowell
John C. Bergner

INVENTOR:
JOHN E. ZIMMERMAN,
by Paige, Paul & Foley
Attys.

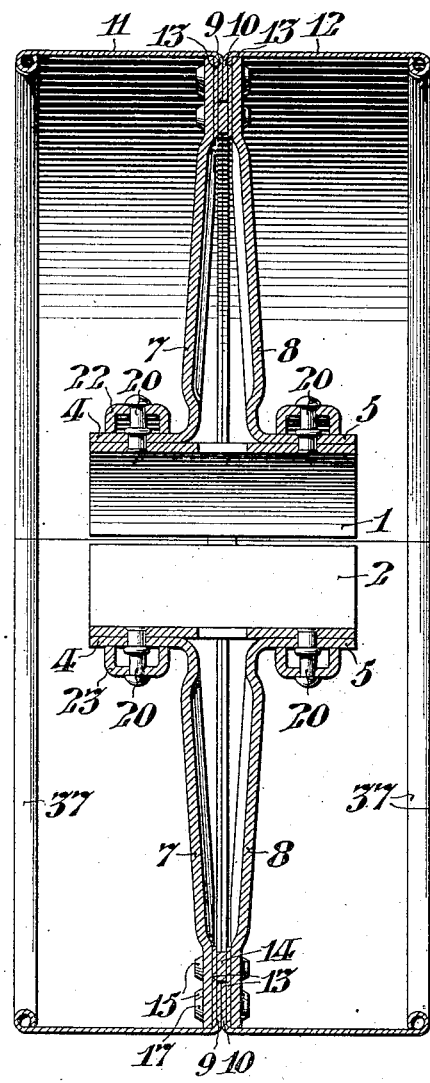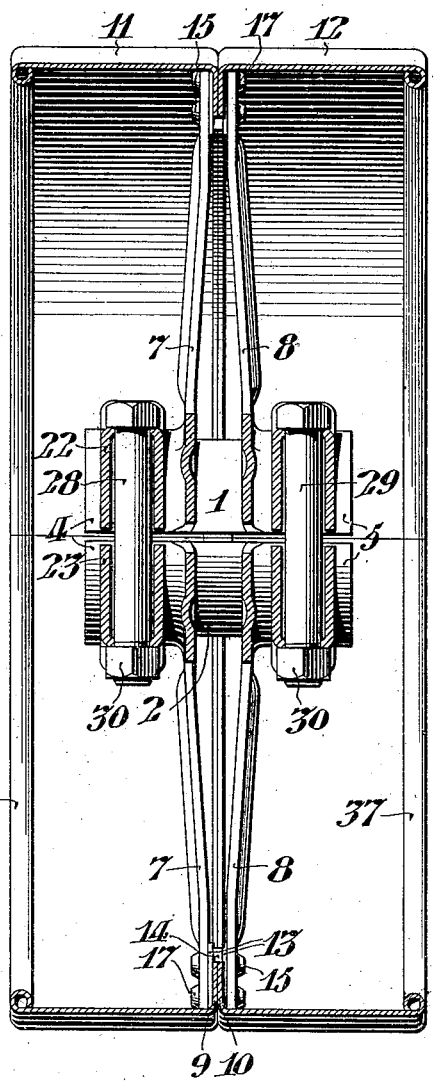

No. 849,309. PATENTED APR. 2, 1907.
J. E. ZIMMERMAN.
WHEEL.
APPLICATION FILED MAY 26, 1905.
3 SHEETS—SHEET 3.
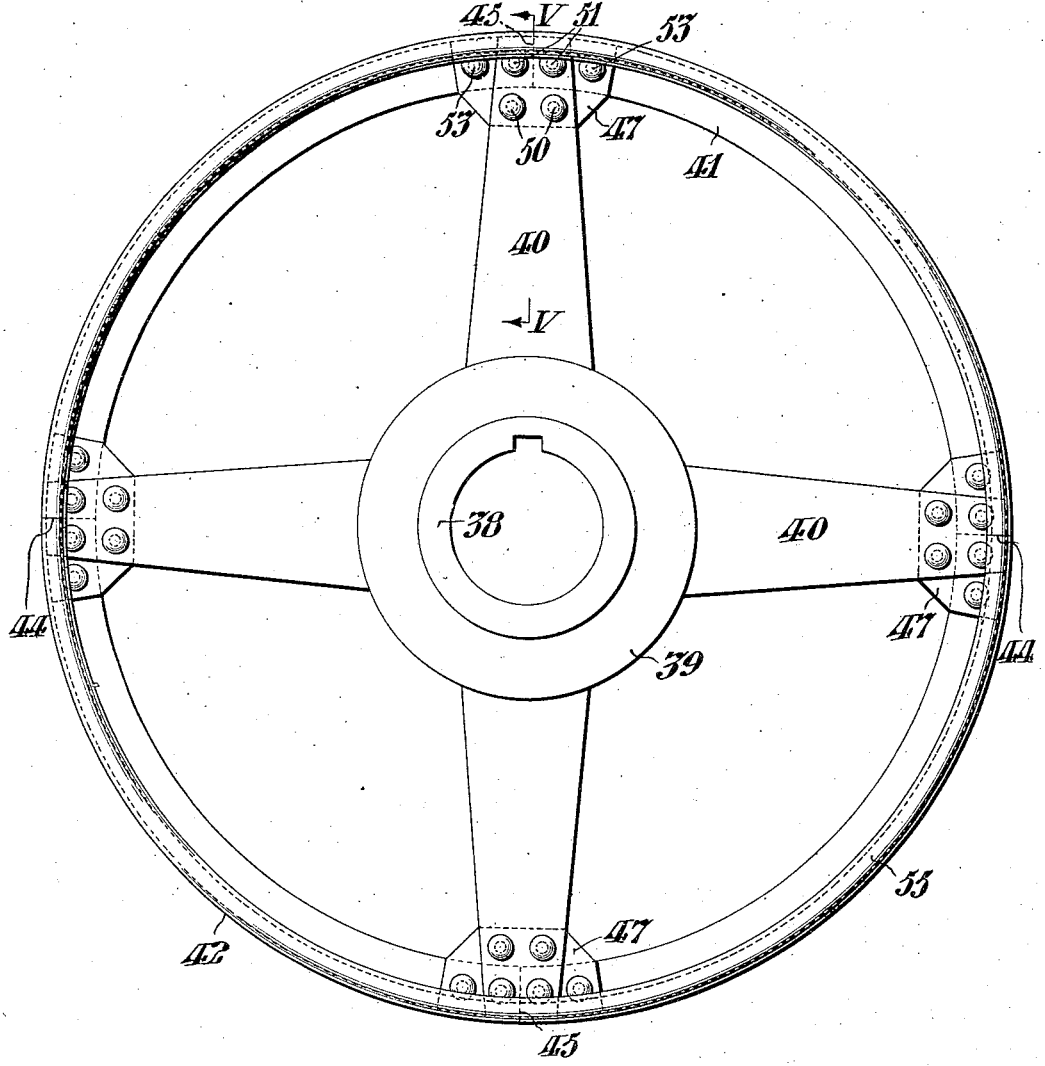
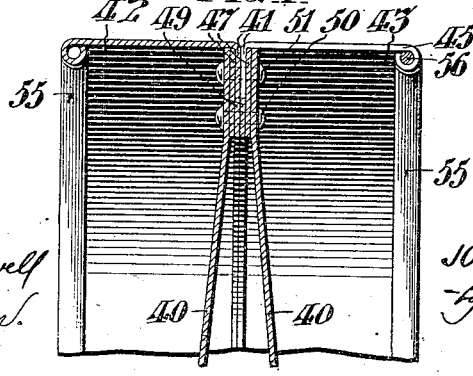
WITNESSES:
Clifton C. Hallowell
John C. Bergner
INVENTOR:
JOHN E. ZIMMERMAN,
by Paige, Paul & Fraley,
Attys.

UNITED STATES PATENT OFFICE.

JOHN E. ZIMMERMANN, OF WILLOW GROVE, PENNSYLVANIA, ASSIGNOR TO THE AMERICAN PULLEY COMPANY, OF PHILADELPHIA, PENNSYLVANIA, A CORPORATION OF PENNSYLVANIA.

WHEEL.

No. 849,309.  Specification of Letters Patent.  Patented April 2, 1907.

Application filed May 26, 1905. Serial No. 262,351.

*To all whom it may concern:*

Be it known that I, JOHN E. ZIMMERMANN, of Willow Grove, in the State of Pennsylvania, have invented certain new and useful Improvements in Wheels, whereof the following is a specification, reference being had to the accompanying drawings.

My improvements are particularly applicable to spoked wheels constructed wholly of metal; and it is the object of my invention to form such a wheel with braces arranged to resist the torsional strains at the junction of the spokes with the rim at less cost of manufacture than heretofore.

As hereinafter described, my invention comprises a pulley having a metal hub and spoke members formed of pressed sheet metal secured to said hub and to inwardly-turned flanges of sectoral sections of sheet metal forming the wheel-rim. Said spoke members are disposed in pairs which converge radially outwardly from the hub to the rim-flanges aforesaid and embrace between their outer ends and said rim-flanges opposite counterpart gusset-plates of greater circumferential extent than the ends of said spoke members and of greater radial extent than said rim-flanges. Said rim-sections may be arranged in two circumferential series with their joints in staggered relation, said gusset-plates being arranged to bridge said joints and maintain said sections in rigid relation.

My invention comprehends the various novel features of construction and arrangement hereinafter more definitely specified.

In the drawings, Figure I is a side elevation of a split pulley conveniently embodying my improvements. Fig. II is a diametrical sectional view of said wheel, taken on the line II II in Fig. I. Fig. III is a tangential sectional view of said wheel, taken on the line III III in Fig. I. Fig. IV is a side elevation of a whole pulley, showing a modified form of my invention. Fig. V is a radial sectional view taken on the line V V in Fig. IV.

Referring to the form of my invention shown in Figs. I, II, and III, the hub comprises opposed counterpart semicylindrical sections 1 and 2, of pressed sheet metal, arranged to embrace a shaft. Said hub-sections are provided at their opposite ends with semicircular flanges 4 and 5, with which the spoke members 7 and 8 are in integral relation, said members being disposed in pairs in axial alinement converging outwardly from the hub to the rim to embrace the inwardly-turned flanges 9 and 10 on the axially-alined semicylindrical sheet-metal members 11 and 12, which constitute the rim.

The gusset-plates 13 are arranged between the outer ends of said spoke members 7 and 8 and said flanges 9 and 10, on opposite sides of the latter, as best shown in Fig. II, and the spaces between the inner edges of said gusset-plates are preferably filled by plates 14 of the same thickness as said flanges, as shown in Fig. II. Said spoke members 7 and 8 are secured in rigid relation with said gusset-plates 13 by the rivets 15, which extend through said spoke members and the flanges 9 and 10, and by the rivets 17 upon opposite sides of the ends of said spoke members, as shown in Fig. I, which extend only through the gusset-plates 13 and said flanges 9 and 10. Said hub-flanges 4 and 5 are secured to the hub-sections 1 and 2 by the rivets 20 and 21, and, as shown in Figs. I and II, said rivets 20 extend through and also secure the hollow sheet-metal bolt-brackets 22 and 23, which are counterpart and respectively carried by the opposed hub-sections 1 and 2, as shown in Fig. I.

As indicated in Fig. I, the hub and rim of the wheel are divided and separable on their common horizontal diameter, and it is to be understood that the wheel may be securely clamped on a shaft by the bolts 28 and 29, which extend through said brackets 22 and 23 and are provided with the nuts 30. The outer edges of said rim-sections 11 and 12 are conveniently connected together by the bolts 32 and 33, extending through the brackets 34 and 35, riveted to the respective rim-sections, which latter are also conveniently reinforced at their outer circumferential edges by inwardly-turned curved flanges 37, which may be hollow or inclose metal rods. However, it is to be understood that my invention may be embodied in a whole pulley—such, for instance, as is shown in Figs. IV and V, wherein the hub 38, which may be conveninetly formed of cast metal, is provided with annular flanges 39 upon the respectively opposite sides of pairs of spoke members 40, which converge radially outward to embrace the inwardly-turned flanges 41 on the axially-alined semicylindrical sheet-metal members 42 and 43, which are arranged in two circumferential series having their joints 44 and 45 in staggered relation. The gusset-plates 47 are arranged between the ends of said spoke members 40 and flanges 41 on opposite sides of the latter in axial alinement, so as to bridge the joints between said rim members, and the spaces between the inner edges of said gusset-plates 47 are preferably filled by spacing-plates 49 of the same thickness as said flanges 41, as indicated in Fig. V. Said spoke members 40 are secured in rigid relation with said gusset-plates 47 by the rivets 50, which extend through said spokes and the spacing-plates 49; by the rivets 51, which extend through said spoke members 40 and the flanges 41, and by the rivets 53 upon opposite sides of the ends of said spoke members 40, as shown in Fig. I, which extend only through the gusset-plates 47 and said flanges 41. The outer edges of said rim members 42 and 43 are conveniently reinforced by inwardly-turned curved flanges 55, which may be hollow or may inclose metal rods 56, the latter being either local to the joints 44 and 45 or extending throughout the circumference of the rim.

I claim—

1. In a wheel, the combination with a sheet-metal rim comprising sectoral members; of plane gusset-plates extending in a plane at right angles to the axis of the wheel and bridging the joints between said members, substantially as set forth.

2. In a wheel, the combination with a sheet-metal rim comprising axially-alined semicylindrical members; of plane gusset-plates extending in a plane at right angles to the axis of the wheel and bridging the joints between said members, substantially as set forth.

3. In a wheel, the combination with a sheet-metal rim, comprising axially-alined sectoral members having their joints in staggered relation; of plane gusset-plates extending in a plane at right angles to the axis of the wheel and bridging the joints between said members, substantially as set forth.

4. In a wheel, the combination with a sheet-metal rim comprising sectoral members having inwardly-turned flanges extending in a plane at right angles to the axis of the wheel; of plane gusset-plates extending parallel with said flanges and bridging the joints between said members; and, means securing said gusset-plates in rigid relation to said flanges, substantially as set forth.

5. In a wheel, the combination with a sheet-metal rim comprising axially-alined sectoral members, having their joints in staggered relation; of plane gusset-plates extending in a plane at right angles to the axis of the wheel, and bridging the joints between said members; and, means securing said rim members and gusset-plates in rigid relation, substantially as set forth.

6. In a wheel, the combination with a sheet-metal rim comprising axially-alined sectoral members having their joints in staggered relation; of plane gusset-plates extending in a plane at right angles to the axis of the wheel, and bridging the joints between said members, and, means securing said rim members and gusset-plates in rigid relation, comprising spoke members and rivets extending through the same, substantially as set forth.

7. In a wheel, the combination with a rim comprising sectoral sections; of a hub; spoke members connecting said rim and hub having plane ends overlapping the joints between the rim-sections; plane gusset-plates overlapping the joints between said rim-sections and extending in a plane at right angles to the axis of the wheel; and, means extending through said spoke members, gusset-plates and rim-sections securing them in rigid relation, substantially as set forth.

8. In a wheel, the combination with a rim comprising axially-alined sections having inwardly-extending central circumferential flanges; of spoke members having ends engaged with said flanges; plane gusset-plates local to said spoke members, of greater radial extent than said flanges; filling-plates distinct from said flanges and from said spoke members, interposed between the latter; and, means extending through said spoke members, gusset-plates and filling-plates securing them in rigid relation, substantially as set forth.

In testimony whereof I have hereunto signed my name, at Philadelphia, in the State of Pennsylvania, this 24th day of May, 1905.

JOHN E. ZIMMERMANN.

Witnesses:
WM. R. SIMPSON,
JOSEPH ENTWISLE.